US012442756B2

(12) United States Patent
Shaw et al.

(10) Patent No.: US 12,442,756 B2
(45) Date of Patent: Oct. 14, 2025

(54) METHOD AND SYSTEM FOR DETERMINING AT LEAST ONE PROPERTY OF MAGNETIC MATTER

(71) Applicants: THE REGENTS OF THE UNIVERSITY OF COLORADO, Denver, CO (US); The Regents of the University of California, Oakland, CA (US); Government of the United States of America as represented by the Secretary of Commerce, Gaithersburg, MD (US)

(72) Inventors: Justin M. Shaw, Louisville, CO (US); Thomas J. Silva, Boulder, CO (US); Hans Toya Nembach, Boulder, CO (US); Grant A. Riley, Lafayette, CO (US)

(73) Assignees: The Regents Of The University Of Colorado, Denver, CO (US); The Regents of the University of California, Oakland, CA (US); Government of the United States of America as represented by the Secretary of Commerce, Gaithersburg, MD (US)

( * ) Notice: Subject to any disclaimer, the term of this patent is extended or adjusted under 35 U.S.C. 154(b) by 203 days.

(21) Appl. No.: 18/024,708

(22) PCT Filed: Sep. 4, 2021

(86) PCT No.: PCT/US2021/049176
§ 371 (c)(1),
(2) Date: Mar. 3, 2023

(87) PCT Pub. No.: WO2022/051692
PCT Pub. Date: Mar. 10, 2022

(65) Prior Publication Data
US 2023/0366809 A1 Nov. 16, 2023

Related U.S. Application Data

(60) Provisional application No. 63/074,665, filed on Sep. 4, 2020.

(51) Int. Cl.
*G01N 21/17* (2006.01)
*G01N 21/47* (2006.01)

(52) U.S. Cl.
CPC ..... *G01N 21/1717* (2013.01); *G01N 21/4738* (2013.01); *G01N 2021/1727* (2013.01); *G01N 2201/06113* (2013.01)

(58) Field of Classification Search
CPC ............ G01R 33/0325; G01R 33/12; G01R 33/1284; G01R 33/032; G01R 33/26;
(Continued)

(56) References Cited

U.S. PATENT DOCUMENTS 7,183,768 B2 * 2/2007 Min ............... G01R 33/1223
324/249
10,274,571 B2 4/2019 Beach et al.
(Continued)

OTHER PUBLICATIONS

International Patent Application No. PCT/US2021/049176, International Search Report and Written Opinion dated Feb. 7, 2022, 6 pages.
(Continued)

*Primary Examiner* — Uzma Alam
(74) *Attorney, Agent, or Firm* — Cozen O'Connor

(57) ABSTRACT

A method for determining at least one property of magnetic matter includes: applying a magnetic field to magnetic matter; directing first light on the magnetic matter at a first set of incident angles; receiving a first set of signatures associated with the first light scattered from the magnetic matter; varying orientation of the magnetic matter with respect to the magnetic field; directing second light on the magnetic matter at a second set of incident angles; receiving a second set of signatures associated with the second light scattered from the magnetic matter; determining, by processing the first set and the second set of signatures accord-
(Continued)

ing to a dispersion relation, at least one property of the magnetic matter.

15 Claims, 11 Drawing Sheets

(58) Field of Classification Search
CPC .... G01R 33/093; G01N 23/202; G01N 21/17; G01N 21/1717; G01N 21/4738; G01N 2021/1727; G01N 2201/06113; G01V 3/14; G01C 11/161; H01L 43/10; H01L 43/12
USPC ......... 356/502, 445, 630–632; 250/393, 550, 250/363.01; 324/420, 421, 441, 244; 428/831.2
See application file for complete search history.

(56) References Cited

U.S. PATENT DOCUMENTS

| | | |
|---|---|---|
| 2002/0021451 A1 | 2/2002 | Hill |
| 2010/0259254 A1* | 10/2010 | Verschuren ............ G01N 15/06 422/68.1 |
| 2010/0267165 A1* | 10/2010 | Bruls ................... G01N 21/552 422/69 |
| 2011/0310387 A1 | 12/2011 | An et al. |
| 2012/0003750 A1* | 1/2012 | Ranzoni ................. G01N 21/51 422/69 |
| 2014/0097841 A1 | 4/2014 | Yang et al. |
| 2015/0177125 A1* | 6/2015 | Kasai ................. G01N 21/7703 422/69 |
| 2017/0343695 A1 | 11/2017 | Stetson et al. |
| 2019/0295616 A1 | 9/2019 | Noh et al. |
| 2020/0072915 A1 | 3/2020 | Zhou et al. |

OTHER PUBLICATIONS

Carlotti, G. et al.; Magnetic Properties of Layered Nanostructures Studied by Means of Brillouin Light Scattering and the Surface Magneto-Optical Kerr Effect, J. Phys.: Condensed Matter 14 (Aug. 2002) pp. 8199-8233.

Vaz, Caf et al.; Magnetism in ultrathin film structures; Rep. Prog. Phys. 71 (Apr. 2008) 056501; 78 pages.

Shaw, J.M. et al.; Precise determination of the spectroscopic g-factor using broadband ferromagnetic resonance spectroscopy; J. Appl. Phys. 114, 243906 (2013); 33 pages.

* cited by examiner

METHOD AND SYSTEM FOR DETERMINING AT LEAST ONE PROPERTY OF MAGNETIC MATTER

RELATED APPLICATIONS

This application is a 35 U.S.C. § 371 filing of International Application No. PCT/US2021/049176, filed on Sep. 4, 2021, which claims priority to U.S. Provisional Patent Application No. 63/074,665, titled "NON-DESTRUCTIVE METHOD FOR THE ACCURATE DETERMINATION AND SPATIAL VARIATION OF THE MAGNETIC THICKNESS, SATURATION MAGNETIZATION AND EXCHANGE CONSTANT IN MAGNETIC THIN FILMS COMPATIBLE WITH NONVOLATILE CMOS MEMORY MANUFACTURING REQUIREMENTS" and filed on Sep. 4, 2020. Each of these applications is incorporated herein by reference in its entirety.

STATEMENT REGARDING FEDERALLY SPONSORED RESEARCH OR DEVELOPMENT

This invention was made with government support under grant number 1553905, IPA1806, awarded by NIST, and grant number DE-SC0018237, awarded by the U.S. Department of Energy. The government has certain rights in the invention.

BACKGROUND

Magnetic random-access memory (MRAM) is a type of non-volatile memory that stores information according to the magnetic direction of the magnet. Unlike some data storage devices that store data in the form of an electrical charge, MRAM stores data according to magnetic domains. Knowledge of the physical properties (e.g., the magnetization saturation and exchange constant) of the magnetic domains are essential for long-term data storage. Current methods to determine these properties include violating the physical integrity of the magnetic matter.

SUMMARY

In one aspect, a method of determining at least one property of magnetic matter includes: applying a magnetic field to magnetic matter; directing first light on the magnetic matter at a first set of incident angles; receiving a first set of signatures associated with the first light scattered from the magnetic matter; varying orientation of the magnetic matter with respect to the magnetic field; directing second light on the magnetic matter at a second set of incident angles; receiving a second set of signatures associated with the second light scattered from the magnetic matter; determining, by processing the first set and the second set of signatures according to a dispersion relation, at least one property of the magnetic matter.

In another aspect, a system for determining at least one property of magnetic matter, including: at least one processor; a memory communicatively coupled with the at least one processor and storing machine readable instructions that, when executed by the processor, cause the processor to: initiate emission of a magnetic field onto magnetic matter; initiate illumination of first light onto the magnetic matter at a first set of incident angles; receive a first set of signatures associated with the first light scattered from the magnetic matter; direct change in orientation of the magnetic matter with respect to the magnetic field; initiate emission of second light on the magnetic matter at a second set of incident angles; receive a second set of signatures associated with the second light scattered from the magnetic matter; determine, by processing the first set and the second set of signatures according to a dispersion relation, at least one property of the magnetic matter.

A system for determining at least one magnetic property of a magnetic matter, comprising: a magnetic element for applying a magnetic field to magnetic matter in parallel direction to a top surface of the magnetic matter in at least one orientation; an light element for directing incident light onto the magnetic matter at at least at one incident angle with respect to the normal of the top surface for each orientation of the applied magnetic field; an interferometer for calculating a frequency difference between the incident light and light scattered from the magnetic matter for each incident angle; and a processor configured to determine at least one magnetic property of the magnetic matter by processing a dataset that includes each frequency difference and a dispersion relation.

DETAILED DESCRIPTION OF THE EMBODIMENTS

Figure 1:
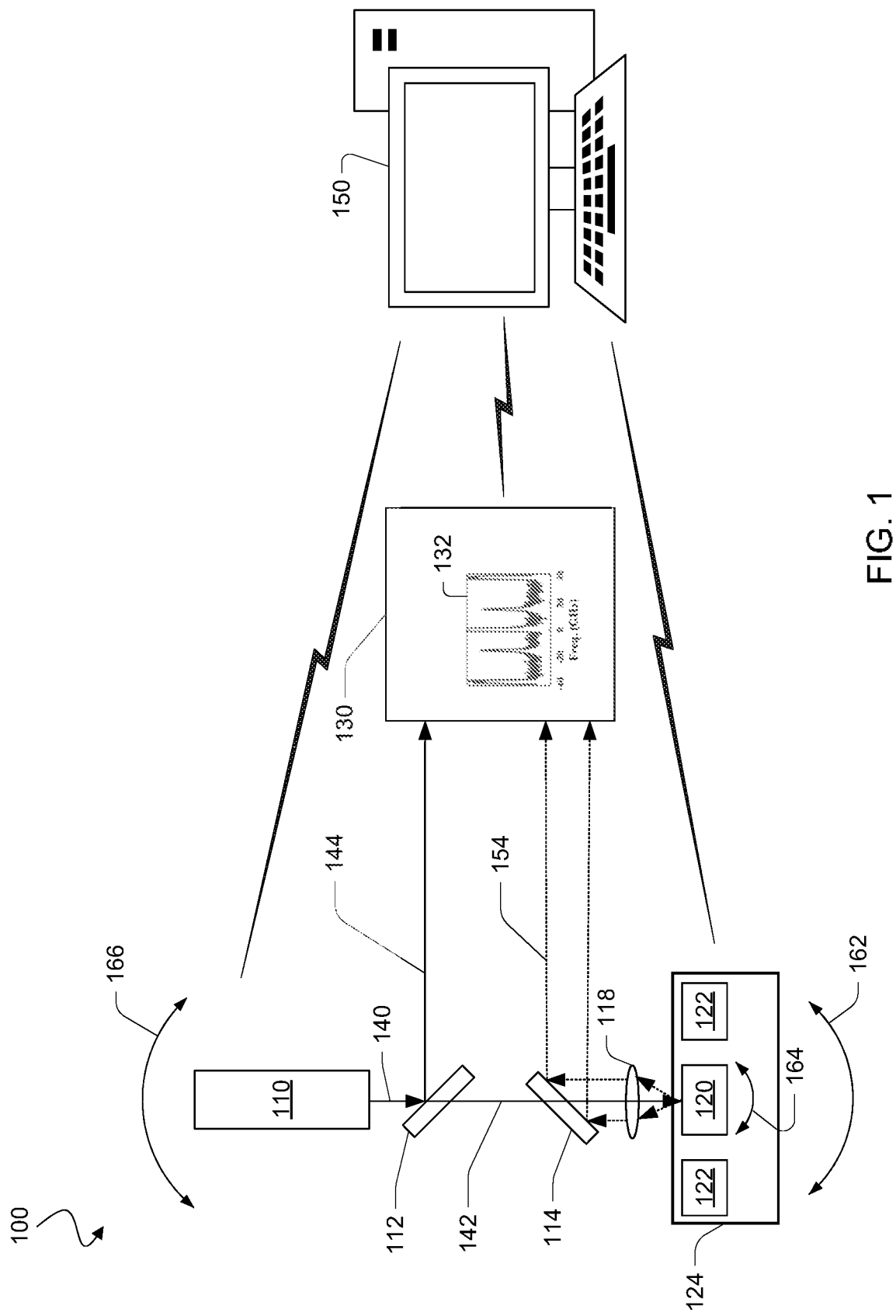
FIG. 1 shows a system for measuring at least one property of a sample of magnetic matter using light scattering, according to an embodiment.

Embodiments of the present disclosure include a method that utilizes optical scattering techniques to determine three critical parameters: the magnetic thickness, saturation magnetization, and the exchange interaction of a magnet. The present disclosure further includes a method of a magneto-optical measurement of waves in the magnetization that propagate relative to the magnetization direction. As such, the present disclosure allows for non-destructive determination of spatial variation of the certain properties across a semiconductor wafer—a strongly desired capability for the manufacture of CMOS-compatible magnetic memory. Embodiments of the present disclosure further achieves a functional, compact, robust and marketable metrology tool for inline wafer inspection in microelectronics fabs.

In an embodiment, the present disclosure utilizes optical spectroscopy to determine a frequency shift in light contacting a magnetic sample and describes a robust and efficient sample stage utilizing commercial permanent magnets that rotate with respect to the magnetic sample. This allows identification of multiple spinwave propagation directions, by a which a simultaneous fit to the complete datasets, yields unique fitted values for the magnetic thickness, saturation magnetization, and exchange interaction.

The exchange interaction is a critical parameter in magnetic based storage and logic devices, yet measurement remains a challenge. While there are a variety of approaches currently used to determine the exchange parameter, each have limitations and agreement among them has not been achieved. To date, neutron scattering, magnetometry, Brillouin light scattering, spin-torque ferromagnetic resonance spectroscopy, and Kerr microscopy have all been used to determine the exchange constant. Advantageously therefore, embodiments of the present disclosure provide methods that exploit the wavevector selectivity of optical scattering (e.g., Brillouin light scattering) to measure spin wave dispersion, in both the backward volume and Damon-Eshbach orientations, of a magnetic sample. The exchange and the saturation magnetization are then determined by a simultaneous fit of both dispersion branches with general spin wave theory without prior knowledge of the thickness of the magnetic deadlayer. Embodiments of the present disclosure demonstrate the strength of this technique for determining the thickness of an ultrathin metallic film, typical of that commonly used in industrial applications for magnetic random-access memory.

Other embodiments of the present disclosure utilize optical scattering (e.g., BLS) to measure the frequency of magnetic fluctuations in magnetic thin films at specific magnetization/optical plane angles. The present disclosure thus provides data analysis methodology that accurately determines magnetic thickness, magnetization density, and exchange constant of a magnetic sample, without needing other structural information about the system. Embodiments of the present disclosure can measure all three parameters with an entire silicon wafer, fulfilling metrology needs of CMOS manufacturers of non-volatile magnetic memory. Potential uses include quality control for spatial uniformity of the measured parameters (i.e., the exchange constant, the magnetic thickness, and the magnetization saturation) across an entire CMOS wafer and in unpatterned blanket films of ultrathin magnetic films prior to lithographic processing. Control of these parameters at nominal values across an entire wafer in the fabrication process is critical for functional magnetic devices. Undesired spatial variation of these parameters for matters grown with commercial sputtering systems on CMOS wafers can negatively impact yield.

At present, the only means of verifying the magnetization density and exchange constant are destructive, requiring the dicing of a wafer into small enough parts (~5-10 mm) to be used in the confined space of a commercial magnetometer. Further, the present disclosure provides the only wafer-level system of its kind to measure these parameters that can also be used for both product development and quality control for CMOS manufacturers of non-volatile magnetic memory.

FIG. 1 is an example of a system 100 that measures a sample magnetic matter 120 (used interchangeably with "sample") using an inelastic scattering method (e.g., Brillouin light scattering, Raman light scattering, etc.). The sample magnetic matter 120 may be, for example, a thin magnetic film deposited on a semiconductor wafer for CMOS-compatible magnetic random-access memory (MRAM). The system 100 may be an in-line metrology tool for providing wafer-level uniformity measurement of critical magnetic matter parameters during a manufacturing process. The present disclosure is not limited to a certain type of inelastic scattering; however, for simplicity, the disclosure will focus on Brillouin light scattering.

System 100 includes an optical light element 110, beam splitters 112 and 114, a focusing lens 118, magnetic elements 122, a sample magnetic matter 120, and an interferometer 130. System 100 may be situated on an optical table (not shown) isolated from vibration. Optical light element 110 may be a laser. Interferometer 130 may be a tandem Fabry-Perot interferometer. In embodiments, interferometer 130 is adjusted with mirror spacing set such that the free spectral range of interferometer 130 is less than 50 GHz. For this range of free spectral range, light element 110 may be a 532 nm laser. In some embodiments, the light element may be any single wavelength laser (e.g., 400 nm, 500 nm, 600 nm, etc.).

The system 100 further includes, in embodiments, a computer 150 (discussed in more detail in FIG. 11) that controls one or both of the light element 110 and a base platform 124 (discussed in greater detail in FIGS. 5, 6) that the sample magnetic matter 120 rests upon. In embodiments, base platform 124 is motorized for a three-dimensional movement. The computer 150 (processor 1120) may send instructions to the light element 110 to reposition the light element 110 in three-dimensional space with respect to the sample magnetic matter 120. Repositioning the light element 110 along path 166 allows the incident angle of the light element 110 at the surface of the sample magnetic matter 120 to be controlled by the computer 150. The computer 150 may further send instructions to the base platform 124 to reorient the magnetic elements 122 (used interchangeably with "magnets") with respect to sample magnetic matter 120. For example, the computer 150 (e.g., processor 1120) may transmit instructions to the base platform 124 to rotate the magnetic elements 122 by ninety degrees along path 162, with respect to the plane of a top surface of the sample magnetic matter 120. In some embodiments, the base platform 124 may tilt the position of the sample magnetic matter 120 in three-dimensional space along path 164, such that an incident angle of the incident light may be changed. Further, the computer 150 may receive data collected by the interferometer 130 regarding received reference light 144 and scattered light 154. In some embodiments, the computer 150 may be wirelessly connected to the light element 110, the base platform 124, and the interferometer 130.

Light 140 from optical light element 110 is split by beam splitter 112 into incident light 142 and reference light 144. Incident light 142 scatters from sample 120, and scattered light 154 after being focused by focusing lens 118 either directly or after being further split by beam splitter 114 into scattered light 154 enters interferometer 130. Interferometer 130 compares the frequencies of between reference light 144 and scattered light 154 and produces a frequency spectrum 132.

Frequencies, or energies, of reference light 144 and scattered light 154 are different in an inelastic scattering. The difference in energy, or shift in frequency, between reference light 144 and scattered light 154 is the basis for studying characteristics of the sample. The scattered light 154, received by the interferometer 130, may have an associated signature that is the difference in frequency between the reference light 144 and the scattered light 154, that reveals properties about the sample. Any inelastic scattering experiment, therefore, may be utilized to measure the magnetic properties proposed in this disclosure. In embodiments, inelastic scattering is achieved using Brillouin light scattering (BLS) method. For determining the exchange parameter, $A_{ex}$, in particular, BLS allows the spin wave dispersion relation (used interchangeably with "dispersion relation") to be fitted to the observed spin-wave frequencies.

Figure 2:
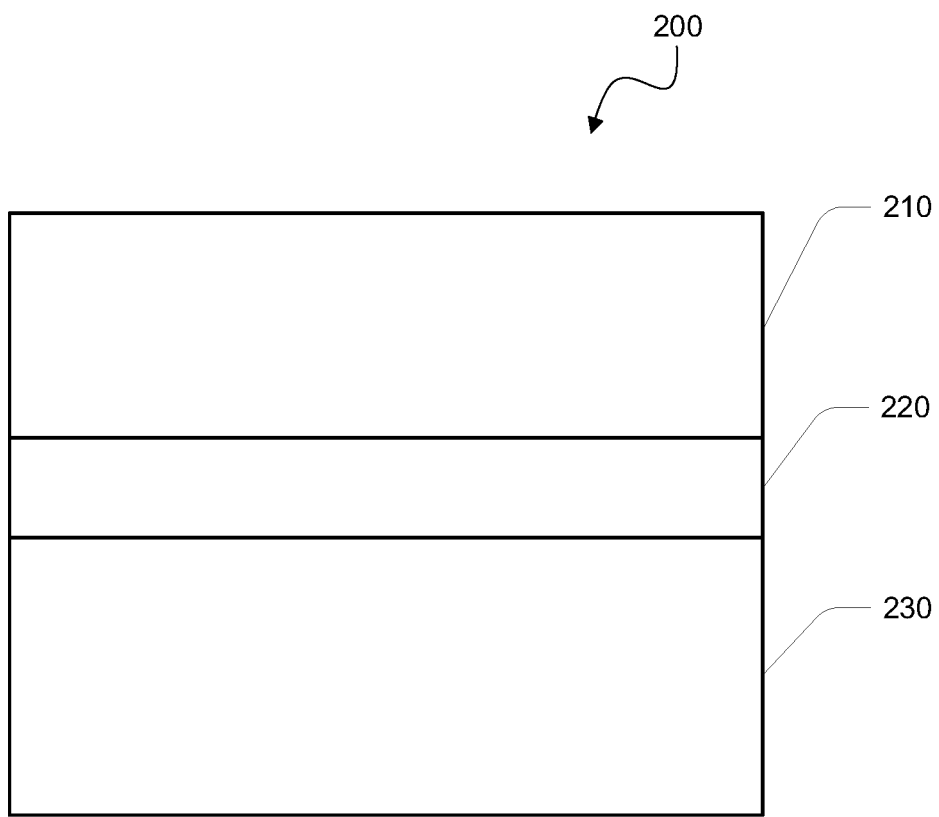
FIG. 2 illustrates a magnetic layer and a dead layer of a thin film deposited upon a wafer, according to an embodiment.

FIG. 2 illustrates a magnetic matter 200, which is an example of sample magnetic matter 120. Magnetic matter 200 includes a magnetic thin film deposited on a non-ferromagnetic material. In embodiments, the non-ferromagnetic material may be a substrate or a wafer. For simplicity, herein, the non-ferromagnetic material is referred to as a wafer. The deposited thin film may include a magnetic layer 210 and a non-magnetic dead layer 220 between the magnetic layer 210 and wafer 230. The dead layer 220 may be a non-magnetized portion of the deposited thin film where the magnetic moments within the thin film are not uniformly aligned in a particular direction; whereas the magnetic layer 210 includes one or more magnetized domains uniformly aligned in a particular direction. The contact of the thin film, upon deposition, with the wafer 230 may create the dead layer 220. Embodiments of the present disclosure determine the thickness of the magnetic layer 210 of the thin film and, consequently, the dead layer 220.

Figure 3:
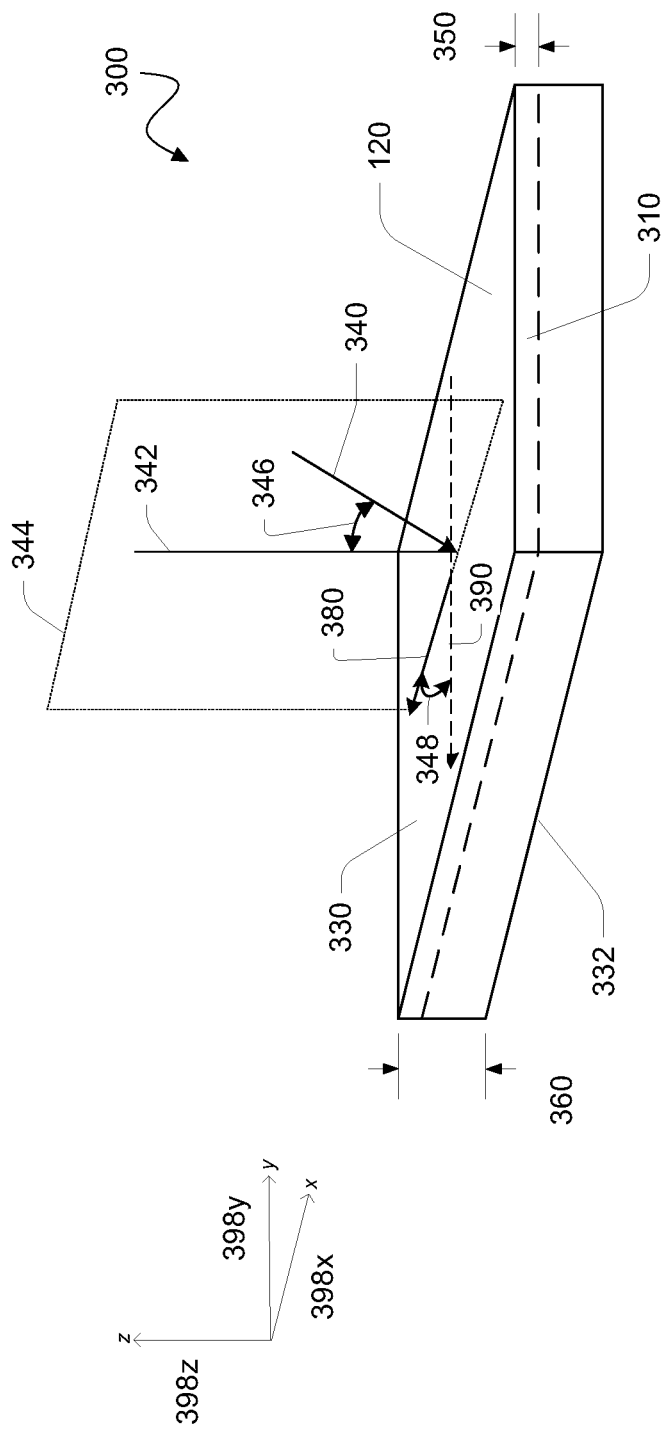
FIG. 3 is an illustration of system, showing the orientation of the sample of magnetic matter with respect to incident light, according to an embodiment.

FIG. 3 is an illustration of a system 300, which shows the orientation of sample 120 with respect to incident light 340, which is an example of incident light 142. In embodiments, sample 120 includes a top surface 330, a bottom surface 332, and a thickness 360. Top surface 330 of sample 120 is parallel to a plane, hereinafter the x-y plane, formed by orthogonal axes 398x and 398y, which are each orthogonal to axis 398z. Herein, a reference to an axis x, y, or z refers to axes 398x, 398y, and 398z respectively. Also, herein, a horizontal plane is parallel to the x-y plane, and a vertical direction is along the z axis.

Normal line 342 is orthogonal to top surface 330 of sample 120. Incident light 340 is incident on top surface 330. Normal line 342 and incident light 340 form a plane 344 that is orthogonal to the top surface 330. The angle between normal line 342 and incident light 340 on plane 344 is incident angle 346, or θ. In embodiments, sample 120 includes a layer of magnetic thin film 310 having a magnetic thickness 350, or t. In embodiments, incident light 340 results in creating spin waves 380 on the surface of magnetic thin film 310.

External magnetic field 390 may be added to create a magnetization on magnetic thin film 310. In embodiments, external magnetic field 390 created by magnets 414 is parallel to the surface of magnetic thin film 310 and forms a plane parallel to the x-y plane with spin waves 380. Angle 348 is formed between external magnetic field 390 and the direction of spin waves 380 on the x-y plane and hereinafter referred to as φ. Magnets 414 may be permanent magnets. Magnet 414 may also be electromagnets.

Figure 4A:
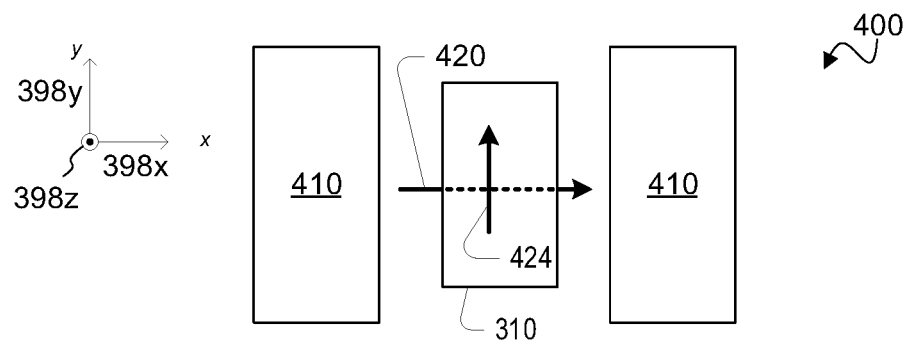
FIG. 4a illustrates an example of an in-plane external magnetic field that is perpendicular to the direction of spin waves in thin film, according to an embodiment.
Figure 4B:
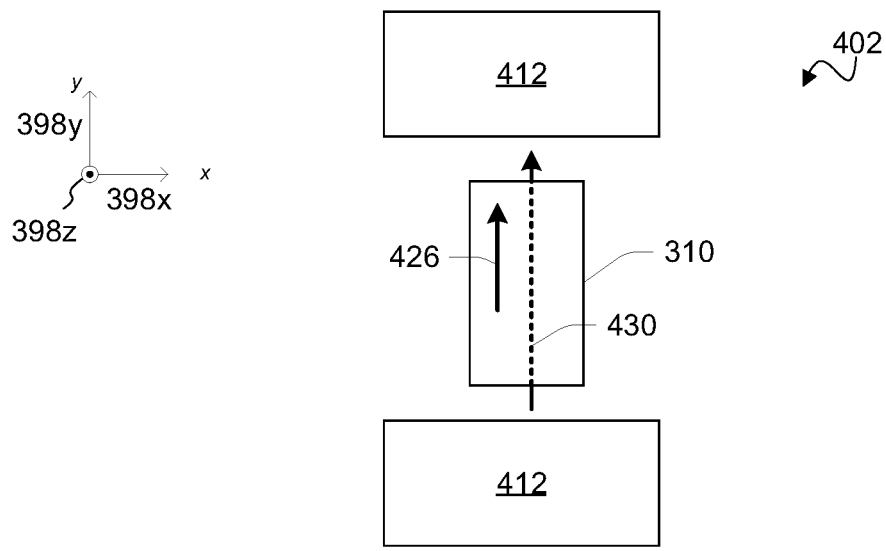
FIG. 4b illustrates an example of an in-plane external magnetic field that is parallel to the direction of spin waves in thin film, according to an embodiment.

Magnetic thin film 310 may be magnetized. FIGS. 4a and 4b show examples of an external magnetic fields that are parallel to the plane, or in-plane, of magnetic thin film 310. FIG. 4a illustrates an example configuration 400 of external magnets 410 aligned such that uniform magnetic field 420, or $H_x$, is formed across magnetic thin film 310 in direction parallel to x-axis. FIG. 4b illustrates an example configuration 402 of external magnets 412 aligned such that uniform magnetic field 430, or $H_y$, is formed across magnetic thin film 310 in direction parallel to y-axis.

When spin waves 424 propagate parallel to surface of in-plane magnetized thin film 310 in direction parallel to y-axis, in configuration 400, direction of the propagation of spin waves 424 is perpendicular to magnetic field 420. Spin waves 424 in such configuration 400 are referred to as magnetostatic surface waves, or Damon-Eshbach (DE) spin waves. Energy associated with a magnetic moment, m, in an external magnetic field, H, is, in part, described by Zeeman energy, $E_Z$, where $E_Z = -m \cdot H$. A minimum Zeeman energy state is achieved when the magnetic moment, m, and the external magnetic field, H, are aligned. In a ferromagnetic matter, therefore, the magnetization is in the direction of the external field. The wavevector, or the direction of spin waves 424, is, in this configuration, perpendicular to magnetization.

In contrast, spin waves 426 in configuration 402, which also propagate parallel to surface of in-plane magnetized thin film 310 in direction parallel to y-axis, are parallel to magnetic field 430. In this configuration, wavevector, or the direction of spin waves 426, is parallel with the magnetization, and the phase and group velocities point in opposite directions resulting in backward propagating waves. Spin waves 426 are referred to as magnetostatic backward volume waves, or simply backward volume (BV) spin waves.

Figure 4C:
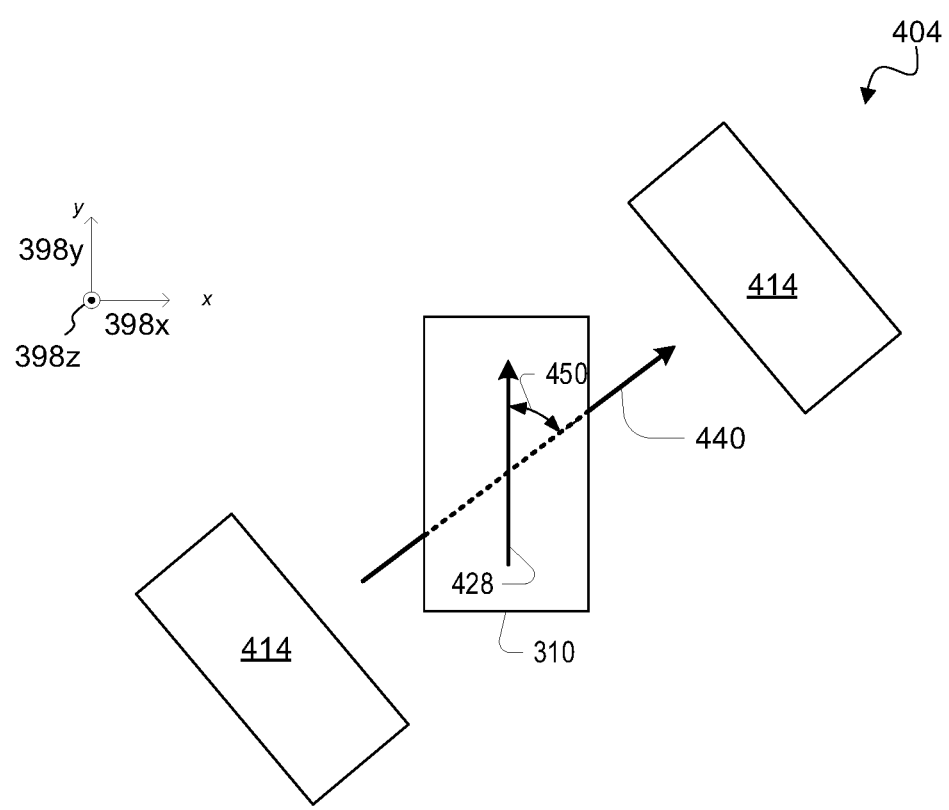
FIG. 4c illustrates a generic orientation of an in-plane external magnetic field in angular relation to the direction of spin waves in thin film, according to an embodiment.

In general, magnetization may be oriented in any direction with respect to the magnetic matter sample. FIG. 4c shows a configuration 404, in which a generalized in-plane, angular relationship between wavevector 428 and magnetization direction 440. Wavevector 428 and magnetization direction 440 form a plane with angle 450, or φ, between the two directions and parallel to the surface plane of the magnetized thin film. When angle 450 is 90°, φ=90°, wavevector 428 is perpendicular to magnetization direction 440 and forms DE spin waves. In contrast, when angle 450 is 0°, φ=0°, wavevector 428 is parallel to magnetization direction 440 and forms BV spin waves.

Figure 5:
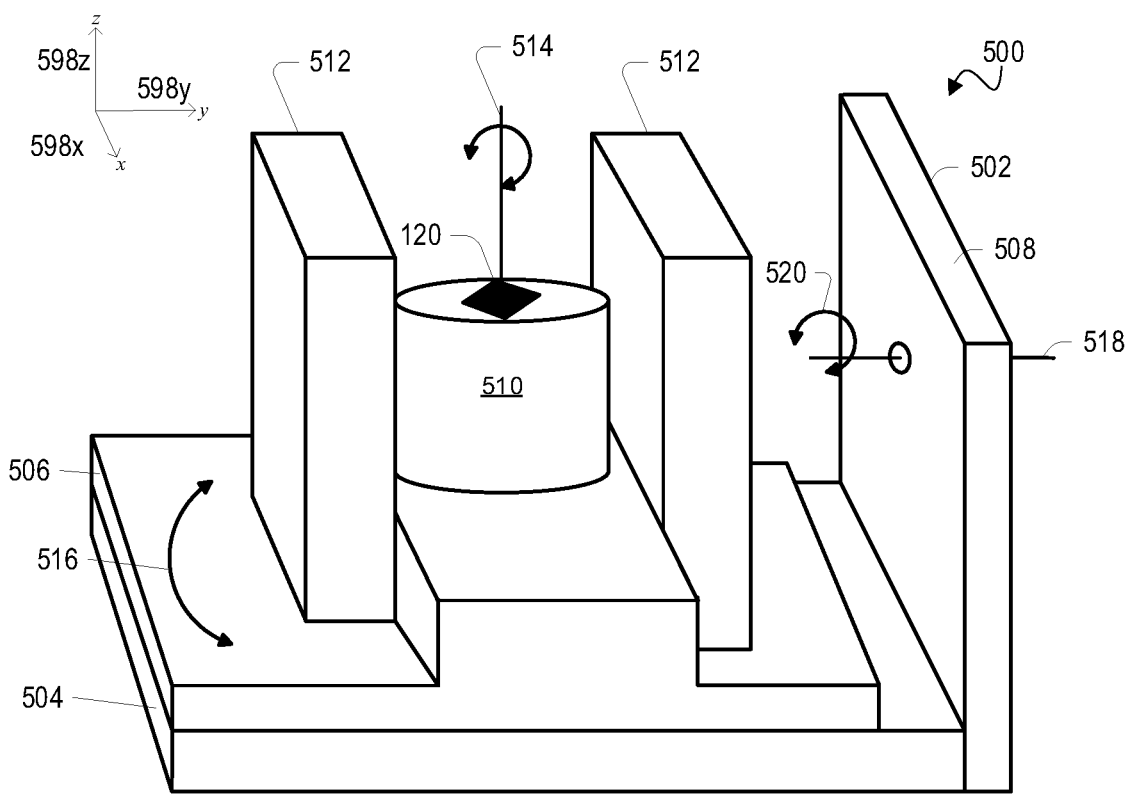
FIG. 5 illustrates a system that includes a structure configured to orient the sample in space, along with permanent magnets applying an external magnetic field, according to an embodiment.

FIG. 5 illustrates a system 500 that includes a base platform 502, which is an example of base platform 124, with a side 508 and a base 504. The base platform 502 may be motorized for a three-dimensional movement and communicatively coupled to a computer (e.g., computer 150) and receive instructions from a processor (e.g., processor 1120) of the computer to reorient the magnetic matter 120 or reorient the magnetic elements 512. The base 504 is parallel to a first plane, hereinafter the x-y plane, formed by orthogonal axes 598x and 598y, which are each orthogonal to axis 598z. The side 508 is parallel to a second plane, hereinafter the x-z plane, formed by orthogonal axes 598x and 598z. Herein, a reference to an axis x, y, or z refers to axes 598x, 598y, and 598z respectively. Also, herein, a horizontal plane is parallel to the x-y plane, a vertical plane is parallel to the x-z plane, and a vertical direction is along the z axis. The structure can be manipulated in any direction so that a light element (e.g., the optical light element 110) can make contact with different portions of the sample 120, at various angles. The side 508 may include a lever 518 or some other mechanical device, parallel to the y-axis, that allows the rotation 520 of the base platform 502, around the y-axis. In embodiments, lever 518 is attached to a motor that may be controlled by a user control interface (e.g., user interface 1194) or a computer (e.g., computer 150). The base platform 502, and therefore, the sample 120 may be positioned or oriented in any way in three-dimensional space, in any axis x, y, or z.

The system 500 further includes sample holder 510 on top of the base 504. The sample holder 510 supports the sample 120 and may include a top surface configured to hold the sample 120 in place during a measurement (e.g., when the light element 110 directs light on the sample). System 500 further includes a platform 506 that also rests on top of the base 504 and holds magnets 512 on top of its surface. The base platform 506 is parallel to the first plane and allows rotation 516 around the z-axis, which results in re-orientation of magnetic field around the sample 120. Further, the sample holder 510 may allow further rotation 514 around the z-axis and height adjustment in the z-direction, for example, to raise or lower the magnetic sample 120 so that light from the light element may be directed on the sample without interference from the permanent magnets 512 (e.g., magnets 410, 412, FIGS. 4a, 4b, respectively). In some embodiments, the magnetic elements 512 may rotate around the sample 120, while the sample 120 is stationary.

The platform 506 may be shaped such that the magnets 512 are a certain distance (e.g., where the sample 120 is placed in the center of top of the sample holder 510) from the sample holder 510. As stated above, the magnets 512 may be any type of magnet (e.g., a rare-earth magnet, etc.) to provide a necessary magnetic field external to the sample 120. The platform may be further shaped to support the magnets 512 in alternate positions, so that the magnetic field produced by the magnets 512 can be of any angle to the spin waves of the sample, created when light from the light element contacts the sample 120, as discussed in FIG. 4a, 4b. For example, the first position (FIG. 4a) of the magnets 512 may be so that the magnetic field is parallel to the spin waves of the sample 120 and the second position (FIG. 4b) may be so that the magnetic field is perpendicular to the spin waves of the sample 120. In some embodiments, the platform 506 may be stationary, while the sample holder 510 rotates to change to the second position, or vice versa, with respect to permanent magnets 512.

Figure 6:
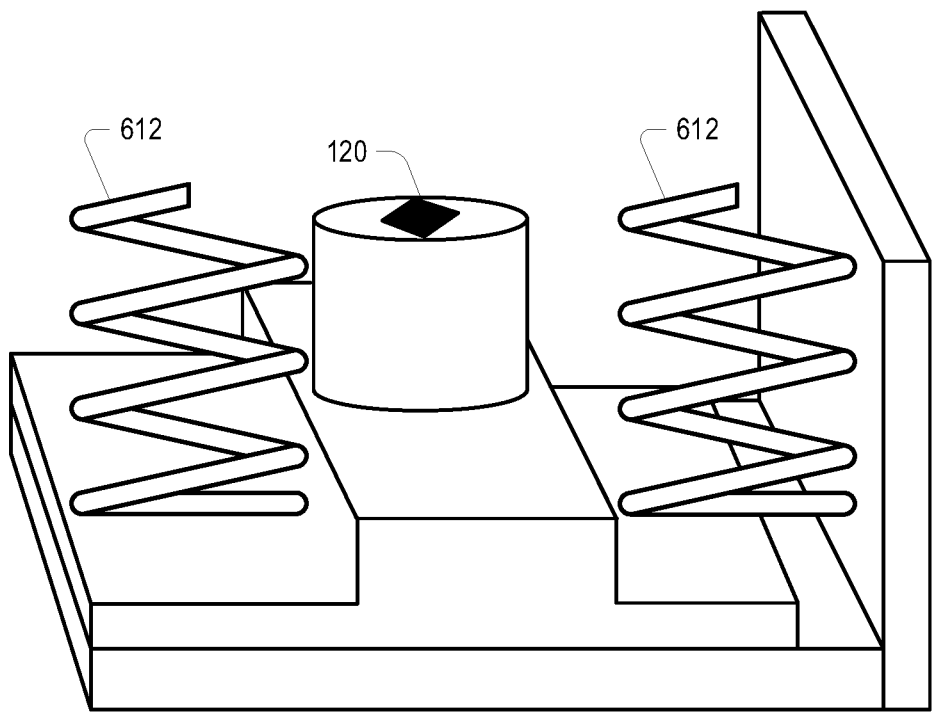
FIG. 6 illustrates the system of FIG. 5 with an electromagnetic device applying the magnetic field, rather than a permanent magnet, according to an embodiment.

In some embodiments, the magnets 512 may be replaced with electromagnets 612, as shown by the system 600 in FIG. 6. The electromagnets 612 may allow for easier adjustment of an external magnetic field as applied to the sample 120. Further, the electromagnets 612 may allow for less physical interference (blocking) of any light from the light element directed on the sample 120. The system 600 may be substantially similar to the system 500, as described in FIG. 5, other than the replacement of magnets 512 with electromagnets 612. For example, the system 600 may be rotatable such that the sample 120 is positioned for the light to be directed upon the same location on the sample 120, in any orientation. In embodiments, the system 500 is motorized and the processor 1120 transmits instructions to the system 500 to rotate, tilt, and reorient itself and the sample 120, as described in FIG. 5.

Figure 7A:
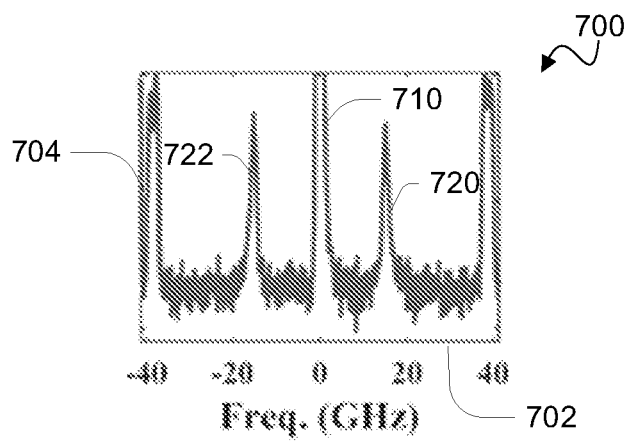
FIG. 7a illustrates a differential frequency spectrum produced by an interferometer, according to an embodiment.

FIG. 7a shows a differential frequency spectrum 700 produced by interferometer 130. Differential frequency spectrum 700, hereinafter frequency spectrum 700, is an example of frequency spectrum 132. Frequency spectrum 700 includes scattered light intensity axis 704 and frequency shift axis 702, where the frequency shift is from the original frequency of incident light 340, which is an example of incident light 142. In embodiments, frequency spectrum 700 shows an elastic scattering peak 710 and inelastic scattering peaks 720 and 722.

Inelastic scattering peaks 720 and 722 show frequency shifts on frequency shift axis 702. The magnitude of frequency shift for each peak represents the amount of energy either lost or gained by the incident light 340, or the amount of energy transferred to sample 120. In embodiments, the transferred energy creates short-range interactions between nearest-neighbor spins in ferromagnetic systems. The energy associated with the short-range interactions is referred to as the exchange energy, so called Heisenberg exchange energy, $E_{ex}$, and is dependent on the nearest-neighbor spins: $E_{ex} = -2J\Sigma_{i=1}^{N} S_i \cdot S_{i+1}$, where spin, $S_{i+1}$, is the nearest neighbor to spin $S_i$, and J is referred to as the exchange integral. In a ferromagnetic system where exchange interactions are assumed to take place only between nearest neighbors, the exchange energy may be simplified to $E_{ex} = A_{ex} \int (\nabla m)^2 dV$, where m is a reduced magnetization or $m = M/M_S$, and $A_{ex}$ is the exchange parameter, $A_{ex} = 2JS^2/a$, where a is the lattice constant.

The exchange parameter, $A_{ex}$, or exchange coupling, which describes the interaction strength between adjacent spins, is mostly experimentally determined. Neutron scattering, magnetometry, BLS, spin-torque ferromagnetic resonance spectroscopy, and Kerr microscopy are some of the techniques utilized to determine the exchange parameter. As discussed above, additional challenges arise with some of these techniques when measuring ultrathin films having a thickness less than 10 nm.

Figure 8:
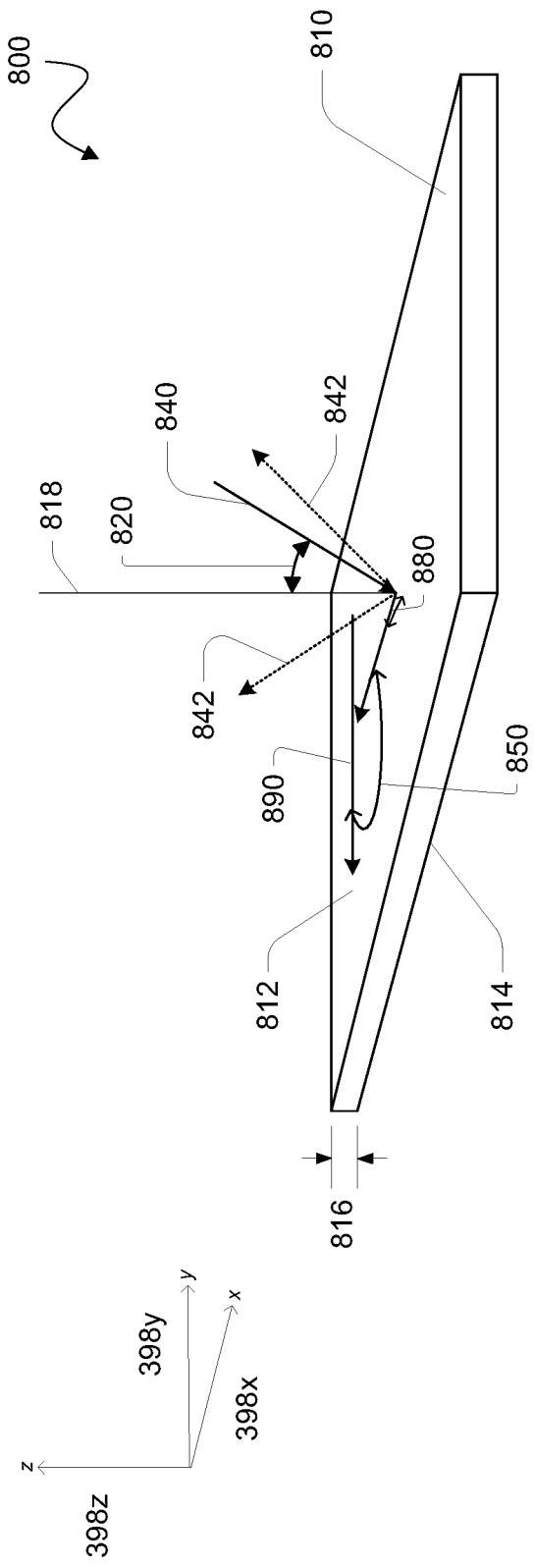
FIG. 8 illustrates an example of a light scattering event on a subject sample.

FIG. 8 illustrates an example of a light scattering event 800 on a subject sample. In embodiments, the light scattering event 800 is a time slice of a BLS measurement and describes a verification of embodiments of the present disclosure, as practiced by the inventors. Light scattering event 800 includes a magnetic thin film 810, which is an example of magnetic thin film 310, external magnetic field 890, incident light 840, and scattered light 842. Magnetic thin film 810 includes a top surface 812 parallel to the x-y plane, bottom surface 814, and thickness 816, which may include magnetic thickness and a magnetically dead layer. In embodiments, incident light 840, which is an example of incident light 142, is at an incident angle 820 with respect to the normal 818. A part of in-plane component of the momentum of incident light 840 may result in spin waves 880 traveling in the direction of the momentum transfer. The direction of the spin waves 880 and external magnetic field 890 form a plane parallel to top surface 812 of magnetic thin film 810, with an in-plane angle 850, or ϕ, between the directions of spin waves 880 and external magnetic field 890. In the example shown in FIG. 8, external magnetic field 890 is aligned perpendicular to the direction of spin waves 880, and the configuration of the light scattering event 800 is, therefore, DE mode of spin waves.

From conservation of the wavevector component parallel to thin film surface 812, the wavevector, k, of spin waves 880 is linked to the wavevector, q, of incident light 840, such that k=2q sin θ, where θ is incident angle 820. The wavevector, q, of incident light 840 is 2π/λ. In embodiments, λ is 532 nm, which results in k=16.7 μm$^{-1}$ for θ=45°.

The relationship between the frequency shift (e.g., frequency shifts of inelastic scattering peaks 722 and 720) and the wavevector, k, of spin waves (e.g., spin waves 880) is described by a spin wave dispersion relation (e.g., the dispersion relation, described above). The dispersion relation may be solved analytically or by using methods including, but not limited to, numerical and simulation methods (e.g., Monte Carlo method, etc.). The present disclosure is not limited to utilizing a certain solution to the dispersion relation; however, for brevity, the disclosure focuses on utilizing an analytical solution to the dispersion relation. Therefore, herein, dispersion relation refers to the analytical solution presented in the following equation:

$$f(k, H, \phi, t) = \frac{\mu_0 \mu_B g}{h} \sqrt{\left(H - H_k + \frac{2A_{ex}}{\mu_0 M_s}k^2 + \mathcal{N} M_s\left(\frac{1-e^{-kt}}{kt}\right)\right)\left(H + \frac{2A_{ex}}{\mu_0 M_s}k^2 + \mathcal{N} M_s\left(\frac{1-e^{-kt}}{kt}\right)\sin^2\phi\right)}$$

where f is the spin wave frequency, g is the spectroscopic splitting factor, H is the external magnetic field, $H_k$ is the out-of-plane anisotropy, $A_{ex}$ is the exchange parameter, $M_S$ is the saturation magnetization, t is the magnetic thickness in thin film, ϕ is the angle between the spin wave wavevector and the magnetization, which angle 850 is an example, $\mathcal{N}$ is an approximate demagnetization factor for ultrathin films with $\mathcal{N} \cong 1-0.2338/n$, where n is the number of monolayers.

Embodiments of the present disclosure include the realization that when using the analytical solution of the dispersion relation, (1) when ϕ is 90° (i.e., for DE spin waves) the sin$^2$ ϕ term in the above equation is 1; however, when ϕ is 0° (i.e., for BV spin waves) the sin$^2$ ϕ term in the above equation is 0. Additionally, (2) the equation above includes only three parameters, $A_{ex}$, $M_S$, and t, that determine the spin wave frequency, f. By measuring the spin wave frequency, f, as a function of wavevector, k, of spin waves, in both DE and BV modes of spin waves, the three unknown parameters, $A_{ex}$, $M_S$, and t, may be determined from fitting the measured data.

Frequency spectrum 700 is an example of one such measurement, where the frequency shift of each of the inelastic scattering peaks 722 and 720 may be determined by, for example, fitting a conventional function, such as Lorentzian or Gaussian function to the peak. The resulting values of frequency shifts along with the wavevector k, which is determined by the system (e.g., system 100, 500, 600), for example, by changing scattering angle 820 of the incident light 840, may be plotted for a plurality of wavevector, k, for both DE and BV modes of spin waves.

Figure 7B:
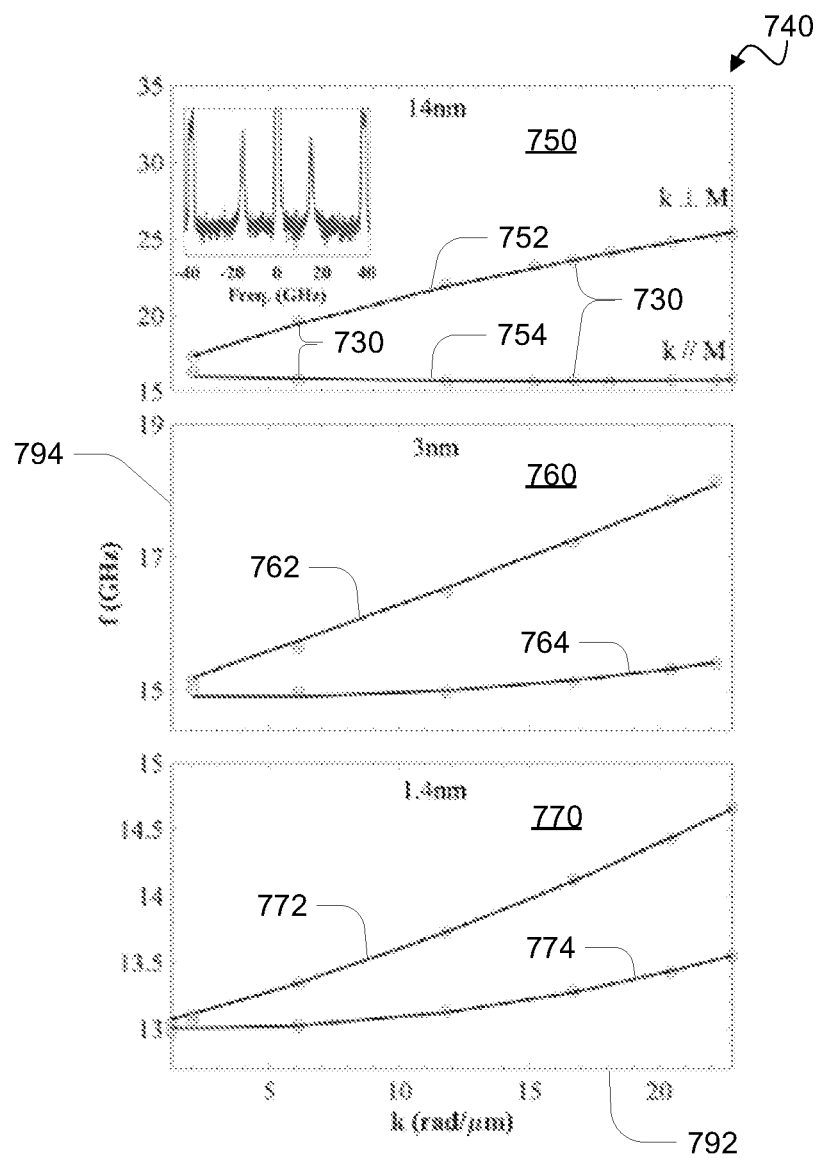
FIG. 7b illustrates a plot of the differential frequency spectrum produced by the interferometer for three magnetic matter samples of various thicknesses, according to an embodiment.

FIG. 7b is an example of such a plot. Plots 740 include plots 750, 760 and 770, each of which represent a set of measurements for a sample with a thickness of magnetic thin film of 14 mm, 3 mm, and 1.4 mm, respectively. Plots 740 includes frequency shift axis 794 and wavevector axis 792. Each circled data point 730 represent a measurement of frequency shift in scattered light, of which scattered light 842 is an example, determined from a frequency spectrum, frequency spectrum 700 for example, at a given wavevector of k. In embodiments, in each of the plots 750, 760, and 770, upper set of circled data points 730 along lines 752, 762, and 772 are obtained from DE spin waves. Likewise, lower set of circled data point 730 along lines 754, 764, and 774 are obtained from BV spin waves.

For each plot of plots 750, 760, and 770, circled data points are fitted using the dispersion relation above to determine the parameters of $A_{ex}$, $M_S$, and t; however, embodiments of the present disclosure are not limited to any particular dispersion relation. Further, any fitting method, for example, maximum likelihood fitting method, may be utilized.

Figure 9:
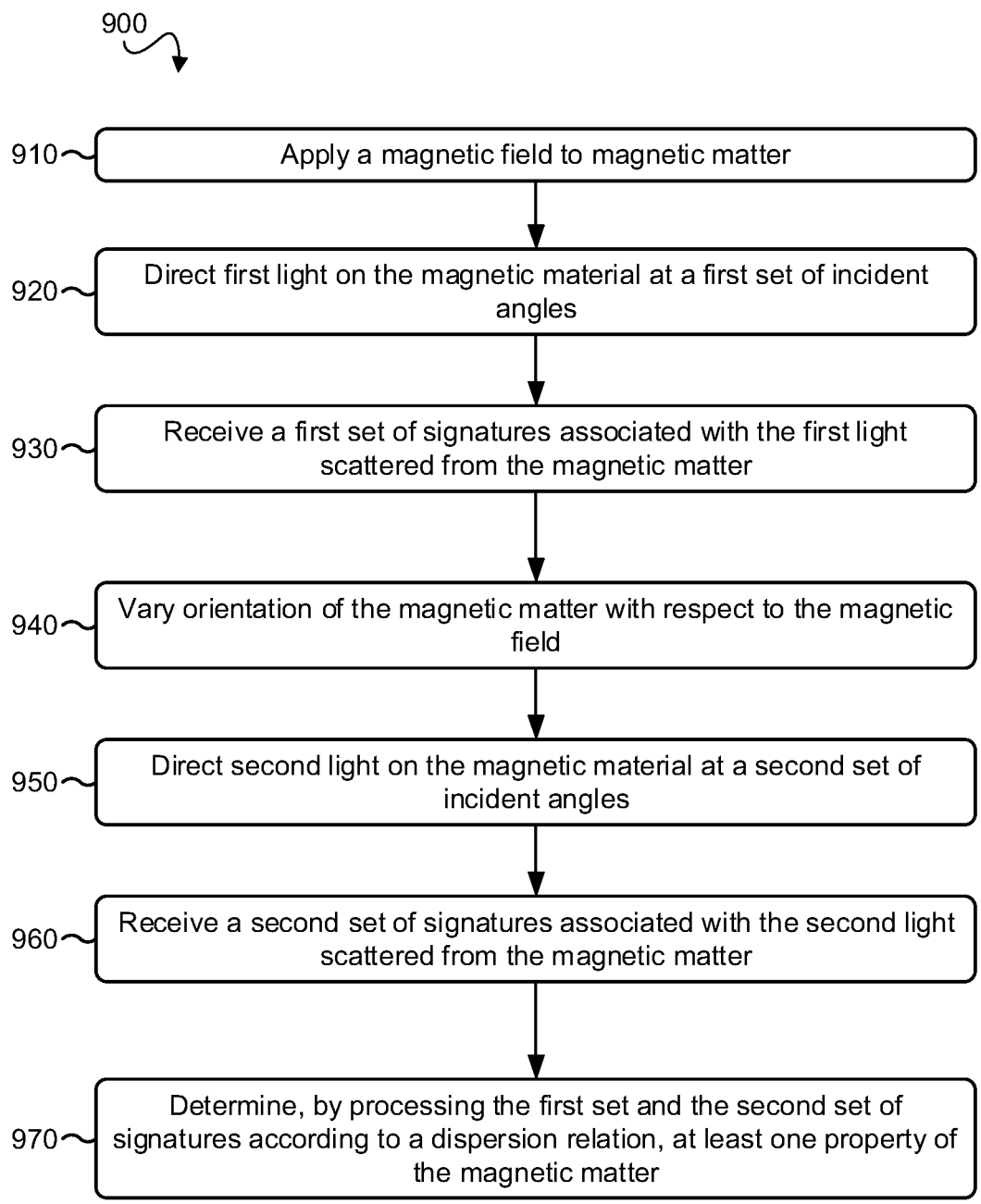
FIG. 9 illustrates a method for determining at least one property (e.g., the magnetic thickness, the exchange constant, and the magnetization saturation) of a sample of magnetic matter, according to an embodiment.

FIG. 9 illustrates a method 900 for determining properties (e.g., the magnetic thickness, the exchange constant, and the magnetization saturation) of a sample of magnetic matter (e.g., sample 120). The method 900 may include applying (910) a magnetic field to magnetic matter. The magnetic field may be applied by a magnetic element and the magnetic element may be a permanent magnet (e.g., magnet 410, 412, 414, 512) or an electromagnet (e.g., electromagnet 612) positioned proximate to the sample. As described in FIGS. 1, 5, 6, the magnetic element may rest upon the base platform 506, proximate to the sample holder 510. The intensity of the magnetic field may be based on a desired property of the magnetic matter. For example, the property being determined is the magnetic thickness (e.g., the thickness of the magnetic layer 210) of the magnetic matter and the desired property of the magnetic matter may be a thickness of 1.4 nm; the intensity, and spatial orientation of the magnetic field with respect to the sample, may correspond to the desired thickness. Further, the direction of the magnetic field, with respect to the spin waves of the magnetic matter created when incident light contacts a surface of the magnetic matter, is considered when applying the magnetic field. For example, the direction of the magnetic field may be parallel (backward volume) or perpendicular (Damon-Eshbach) to the spin waves, as described in FIGS. 4a, 4b, etc. In some embodiments, a processor (e.g., processor 1120) initiates emission of the magnetic field onto magnetic matter.

The method 900 may further include directing (920) a first light (e.g., incident light 142, FIG. 1) on the magnetic matter at a first set of incident angles (as described in FIG. 1, 3, 10a, 10b, etc.). In some embodiments, directing the first light may be based on the light element 110 receiving instructions from the processor 1120 to initiate illumination of first light onto the magnetic matter at the first set of incident angles. For example, the processor 1120 may transmit instructions to the light element to orient the direction of the light emitted from the light element 110 at an initial, particular angle with respect to the magnetic matter. In some embodiments, the light element 110 is not communicatively coupled to a computer 150 and does not receive instructions from the processor 1120, but rather the instructions to emit light is manually inputted to the light element 110. In some embodiments, the light element may be a laser or any type of light.

The frequency of the first light may be determined based on desired properties of the magnetic matter (e.g., the desired thickness) and/or the system (e.g., system 100, 500, 600), such as the light scattering technique used (e.g., Brillouin light scattering, Raman scattering, etc.). The first set of incident angles may be any degree of predetermined incident angles and any quantity of incident angles, at any of the corresponding incident angles. For example, there may be light shined at multiple angles with respect to the norm of the surface of the magnetic matter, such as 80 degrees, 70 degrees, 60, degrees, etc., at any quantity at each incident angle of the first set of incident angles. In some embodiments, there might by multiple light elements 110 utilized for each incident angle. For example, a first light element shining light at a first incident angle, a second light element shining light at a second incident angle, etc. In some embodiments, the multiple light elements may be included within a same housing or different housings.

The method 900 may further include receiving (930) a first set of signatures associated with the first light scattered from the magnetic matter. The first set of signatures may be the difference in frequency between scattered light 154 (second frequency) and the reference light 144 (first frequency), both received by the interferometer 130, for each incident angle. For example, the first set of signatures may be a value of 30 nm for each incident angle, the difference between the reference light and the scattered light. The scattered light 154, for each incident angle, has a different frequency than the reference light, for each incident angle, caused from interacting with the magnetic matter, and the first set of signatures will reveal properties of the magnetic matter. In some embodiments, the computer 150 is communicatively coupled to the interferometer 130 and the processor receives the first set of signatures associated with the first light scattered from the magnetic matter.

The method 900 further includes varying (940) the orientation of the magnetic matter with respect to the magnetic field. In some embodiments, the varying the orientation of the magnetic matter with respect to the applied magnetic field includes rotating the magnetic matter (e.g., by the base platform 502) by an angle, as discussed in FIGS. 5, 6, 10a, and 10b. For example, rotating the magnetic matter by an angle may include the processor 1120 instructing the base platform 124 to rotate an angle about the plane of the magnetic matter or instructing the light element 110 to rotate (or change orientation) with respect to the magnetic matter. In some embodiments, the processor 1120 instructs the base platform 502 or the light element 110 to direct change in orientation of the magnetic matter with respect to the magnetic field. For example, the processor 1120 transmits the instructions in response to receiving input for a particular orientation of the magnetic matter. In some embodiments, step 940 is optional and there is no varying of the magnetic matter with respect to the magnetic field. For example, there are two light elements 110 positioned adjacent to the magnetic matter and at a different orientation with respect to the magnetic matter, a first light element directs light at a first set of incident angles and the second light directs light at a second set of incident angles, without rotating the magnetic matter. For example a first light element directs light on the magnetic matter creating spin waves in the magnetic matter parallel with the applied magnetic field; and the second light element directs light on the magnetic matter creating spin waves that are perpendicular with the applied magnetic field.

In some embodiments, varying the orientation of the magnetic matter with respect to the applied magnetic field includes rotating the magnetic matter in a plane such that the first set of incident angles is approximate to the second set of incident angles (as described below). In some embodiments, varying the orientation of the magnetic matter with respect to the applied magnetic field includes rotating the first and second (discussed below) directed light by an angle in a plane such that the first set of incident angles is approximate to the second set of incident angles. For example, the sample holder 510 may rotate (e.g., in response to instructions sent by the processor 1120) the sample 120 by ninety degrees, while the magnets (e.g., magnets 512 or 612) are stationary. In some embodiments, varying the orientation of the magnetic matter with respect to the applied magnetic field includes rotating the light element 110 by an angle, as discussed in FIGS. 5, 6, 10a, and 10b. For example, the computer 1120 may instruct the light element 110 to rotate by an angle (e.g., 70, 80, 90, 100 degrees), with respect to the first light, about the plane of the magnetic matter.

In some embodiments, the magnetic elements (e.g., magnets 122, 410, 412, 414, 512, 612, etc.) may rotate with respect to the magnetic matter, while the magnetic matter is stationary. For example, the magnetic elements rotate around the magnetic matter by ninety degrees from the initial position. The varying the magnetic matter with respect to the magnetic field may result in second light directed at the magnetic matter creating spin waves that are in a different orientation, with respect to the magnetic field, than the first light directed on the magnetic matter. For example, if the direction of the first applied magnetic field was perpendicular to the spin waves of the magnetic matter (Damon-Eshbach), the direction of the second applied magnetic field may be parallel (backward volume), and vice versa. The intensity of the magnetic field, following the rotation, may be substantially similar, equal to, or different from the intensity of the initial, applied magnetic field. In the embodiment of the magnetic fields being the same magnetic field, the sample may be rotated by a predetermined angle (e.g., ninety degrees).

The method 900 further includes directing (950) second light on the magnetic matter at a second set of incident angles. In some embodiments, the processor 1120 initiates emission of second light on the magnetic matter at a second set of incident angles. The second set of incident angles may be at a substantially similar orientation as the first set of incident angles. In some embodiments, the second set of incident angles may be at a different orientation than the first set of incident angles. In some embodiments, the first light and the second light are from the same light element 110. In some embodiments, the first and second light are from different light elements. The first directed light may create spin waves of the magnetic matter that is parallel (backward volume) to the applied magnetic field; the second directed light (rotation of the light element by ninety degrees) may cause the spin waves of the magnetic matter to be perpendicular (Damon Eshbach) to the applied magnetic field. In some embodiments, the degree and/or quantity of the second set of incident angles may be different than the first set of incident angles.

The method 900 further includes receiving (960) a second set of signatures associated with the second light scattered from the magnetic matter. In some embodiments, the processor 1120 may receive the second set of signatures associated with the second light scattered from the magnetic matter. The second set of signatures may be the scattered light from each of the second directed light at the second set of incident angles. Each received signature of the second set of signatures may be a difference in frequency between scattered light 154 (second frequency) and the reference light 144 (first frequency), both received by the interferometer 130. The scattered light 154 has a different frequency than the received light caused from interacting with the magnetic matter, and the second signature will reveal properties of the magnetic matter.

The method 900 further includes determining (970), by processing the first and second set of signatures according to a dispersion relation, at least one property of the magnetic matter. In some embodiments, the processor 1120 determines, by processing the first and second set of signatures according to a dispersion relation, at least one property of the magnetic matter. The processing the first and second set of signatures according to the dispersion relation may include mapping the received first and second signatures, as discussed with reference to FIGS. 7a, 7b. The first and second signatures may each be mapped as f (in GHZ), the spin wave frequency, discussed above, as a function of k, the spin wave wavenumber, discussed above; however, embodiments of the present disclosure are not limited to mapping the first and second signatures according to the spin wave frequency as a function of the spin wave wavenumber. The first signature may show a trend on the chart that is distinct from the second signature, as shown in FIGS. 7a, 7b. For example, the first signature may show a trend as illustrated by 752, 762, 772, and the second signature may show a trend as illustrated by 754, 764, and 774. In some embodiments, the first and second signatures may be mapped according to other characteristics than the spin wave number and spin wave frequency, as known in the art.

The processing the first and second set of signatures according to a dispersion relation may further include fitting the first and second signatures according to a dispersion relation. In some embodiments, the dispersion relation is $$f(k, H, \phi, t) = \frac{\mu_0 \mu_B g}{h} \sqrt{\left(H - H_k + \frac{2A_{ex}}{\mu_0 M_s}k^2 + \mathcal{N} M_s\left(\frac{1-e^{-kt}}{kt}\right)\right)\left(H + \frac{2A_{ex}}{\mu_0 M_s}k^2 + \mathcal{N} M_s\left(\frac{1-e^{-kt}}{kt}\right)\sin^2\phi\right)}$$

where f is the spinwave frequency, g is the spectroscopic splitting factor, H is the external field, $H_k$ is the out-of-plane anisotropy, $A_{ex}$ is the exchange parameter at room temperature, $M_s$ is the saturation magnetization at room temperature, k is the spin wave wavenumber, $\mathcal{N}$ is the demagnetization factor for ultrathin films, given by $$\mathcal{N} = 1 - \frac{0.2338}{n},$$

where n is the number of monolayers, t is the thickness of the magnetic layer, and $\phi$ is the angle between the wavevector and the magnetization with $\sin^2 \phi = 1$ or $\sin^2 \phi = 0$, for the Damon-Eschbach and back-volume geometry, respectively. Typically, the demagnetization factor is calculated using a continuum model; however, that model does not apply for magnetic matter samples with a few atomic layers due to the discreteness of the moments around atomic sites that leads to a dipolar field that varies with the number of monolayers. The fractions appearing in the dipole terms may be an approximation for thin magnetic films. The properties, $A_{ex}$ ($T_{RT}$,t), $M_S$($T_{RT}$,t), and t, are extracted as sole fitting parameters. In some embodiments, any or all of the properties may be determined. In some embodiments, statistical methods may be utilized (e.g., Monte Carlo, etc.) to determine the fit. Any dispersion relation may be used to fit the first and second signatures; embodiments of the present disclosure are not limited to the above dispersion relation.

Figure 10A:
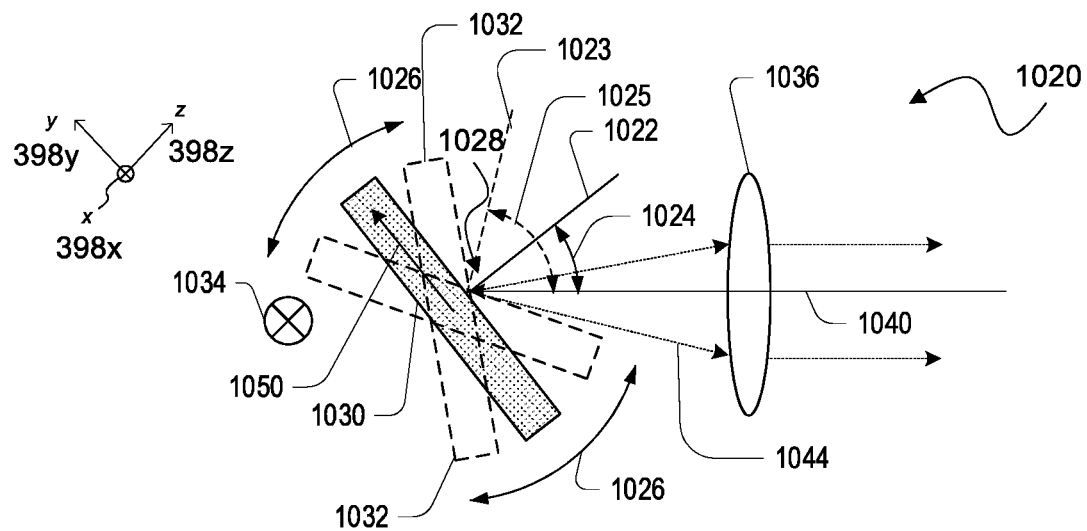
FIG. 10a illustrates a system, which may be commanded by a computer, that controls the incident angle of the incident light by rotating the magnetic matter with respect to a magnetic field, according to an embodiment.
Figure 10B:
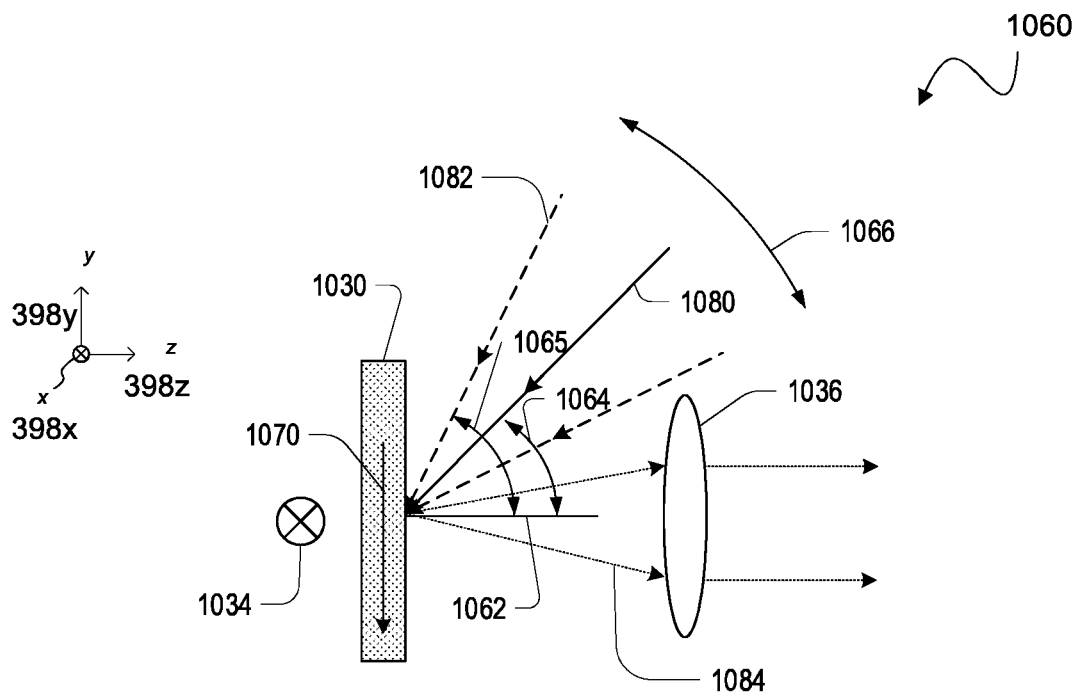
FIG. 10b illustrates a system, which may be commanded by a computer, that controls the incident angle of the incident light by rotating a light element with respect to the magnetic matter, according to an embodiment.

FIGS. 10a and 10b illustrate alternate embodiments of a system, which may be commanded by a computer (e.g., computer 150), to control the incident angle of the incident light. Incident angle control system 1020 includes a motorized base platform for tilting (or rotating) the magnetic matter 1030, which is an example of sample magnetic matter 120 for adjusting the incident angle 1024 of directed light, such that for all tilted configurations of the magnetic matter 1030 including positions 1032, the directed position 1028 of the incident light element remains constant. Incident angle control system 1020 further includes optical devices, such as lens 1036, for focusing scattered light 1044. The rotation of magnetic matter 1030 results in the rotation of the y-z plane about the x-axis, keeping the normal 1022 parallel to the direction of z-axis. Rotation is not limited to any axis and may be rotated about any axis. The rotation may result in new positions 1032 of magnetic matter 1030 with a newly positioned normal 1023 and a new incident angle 1025. The direction of spin waves 1050 created by incident light 1040 remains in the direction of y-axis under rotation of the magnetic matter 1030. Incident light 1040, scattered light 1044, and external magnetic field 1034 (a uniform magnetic field) remain unchanged under rotation 1026. With the control of the incident angle 1024 by rotating the magnetic matter 1030, a dataset may be formed by a set of measurements of scattered light 1044 (a first or second set of signatures), each measurement at a corresponding incident angle of a set of incident angles.

In another example of the incident angle control system 1060 illustrated in FIG. 10b, incident angle control system 1060 has a fixed position for magnetic matter 1030 and includes a motorized system for positioning the incident light 1080 along a plane orthogonal to the top surface of the magnetic matter 1030, such that all positions of the incident light including incident light 1082 create spin waves 1070 in one direction on the magnetic matter, and each position of the incident light element has a unique incident angle. For example, incident light 1080 has a corresponding incident angle 1064 from the normal 1062 of the top surface of magnetic matter 1030; and repositioned incident light 1082 has a corresponding incident angle 1065. The motorized movement 1066 of the incident light may be controlled by a computer (e.g., computer 150). With the control of the incident angle 1064 by repositioning the incident light 1080, a dataset may be formed by a set of measurements of scattered light 1084 (a set of signatures), each measurement at a corresponding incident angle of a set of incident angles.

In an alternate embodiment of the incident angle control system, a plurality of incident light elements (e.g., multiple light elements 110) replaces motorized positioning of the incident light in incident light control system 1060. The incident light elements align in a plane orthogonal to the top surface of the magnetic matter, such that all incident light elements create spin waves in one direction on the magnetic matter, and each incident light element has a unique incident angle. Power for each incident light in the plurality of incident light elements may be controlled by the computer. For both rotating the magnetic matter sample 120, as in FIG. 10a, and rotating the light element, as in FIG. 10b, the rotation will be such that the rotation is in a plane such that the first set of incident angles is approximate to the second set of incident angles.

Figure 11:
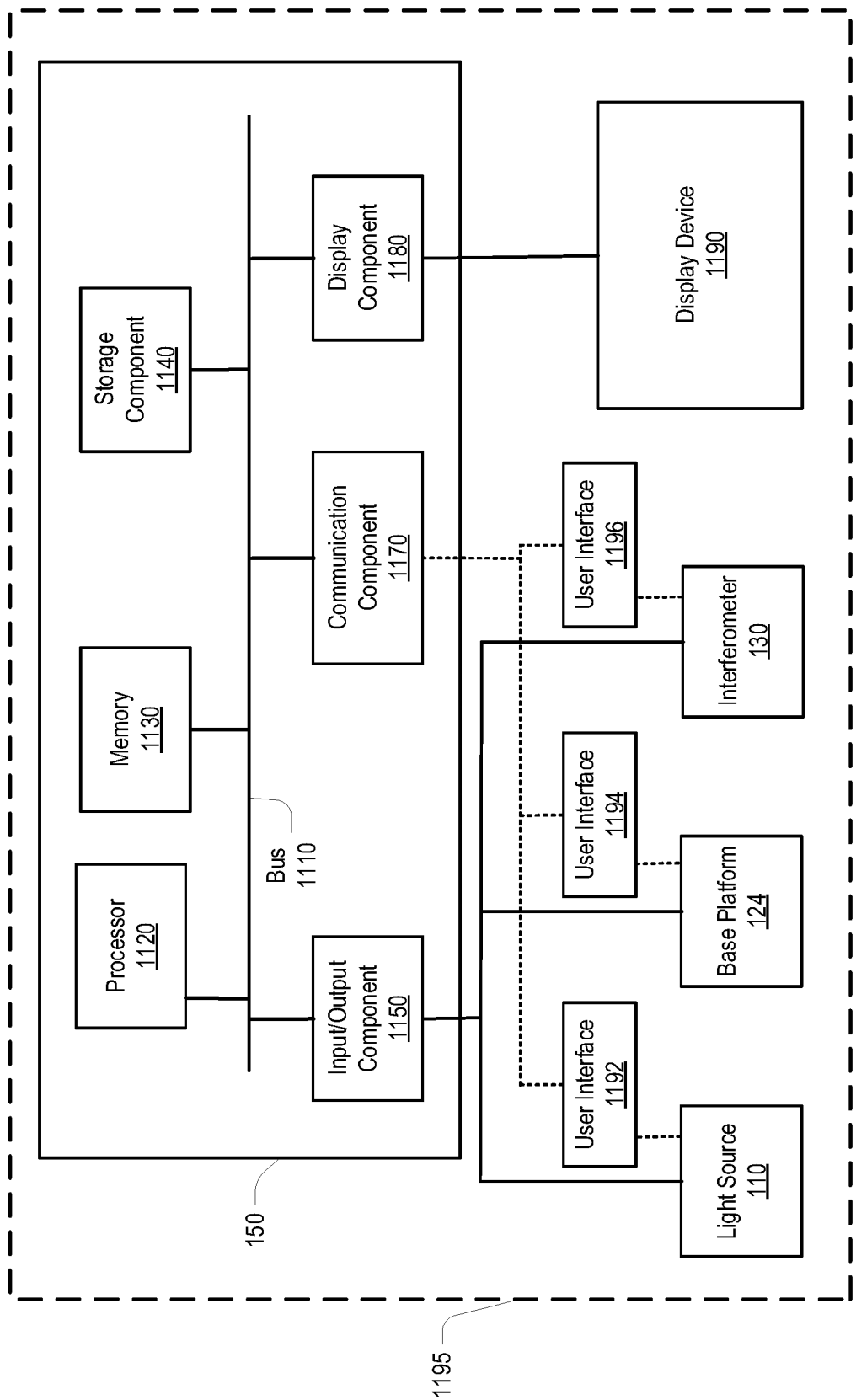
FIG. 11 shows a diagram illustrating an example system for determining at least one property of magnetic matter, according to an embodiment.

FIG. 11 is an example of a system 1100 for determining at least one property of magnetic mater. System 1100 includes a computer 150, in which bus 1110 may provide communication between any of processor 1120, memory 1130, storage component 1140, input/output component 1150, communication component 1170, display component 1180, and a user interface (UI) on display device 1190. Processor 1120 may be a programmable central processing unit capable of executing instructions stored in memory 1130 for instructing the light element 110 and the base platform 124 to vary an orientation of magnetic matter with respect to the magnetic field and/or light element, in three-dimensional space, as discussed above. In some embodiments, the instructions may be inputted by a user or pre-programmed. For example, the inputted instructions may include a spatial orientation for the light element 110 and the base platform 124. Further, the processor 1120 may be capable of executing instructions stored in memory 1130 for receiving the collected first set and second set of signatures from the interferometer 130, and then processing the first set and second set of signatures according to a dispersion relation to determine at least one property of the magnetic matter sample 120, as discussed above at least in FIG. 9.

The memory 1130 may also reside within the storage component 1140 for longer-term storage. Input/output component 1150 may be communicatively coupled to the interferometer 130 and may receive the first set of signatures and the second set of signatures received by the interferometer 130, and then transmit the sets of signatures, through the bus 1110, to the processor 1120 for processing the sets of signatures according to the dispersion relation. Further, input/output component 1150 may be communicatively coupled to the base platform 124 and the light element 110. In some embodiments, the input/output component 1150 may be communicatively coupled to more than one light element 110 (e.g., two, three, four, etc.).

Communication component 1170 may communicate either, or both, physically and wirelessly with other computing devices, e.g., wirelessly with a computing device nearby. In some embodiments, the communication component 1170 may communicate with one or more of graphical user interfaces 1192, 1194, and 1196, which in turn are communicatively coupled to the light element 110, the base platform 124, and the interferometer 130, respectively.

Display component 1180 may provide one or more connections for one or more display devices. For example, the display component 1180, upon receiving the first set of signatures and the second set of signatures (or more than two sets of signatures) may chart the data points within a graphical interface on display device 1190 in system 1100. The display component 1180 may further output a visual representation of the mapping of the first set and second set of signatures, as discussed with reference to FIG. 9. Further, the display component 1180 may output the numerical values of the magnetic matter properties based on fitting according to the dispersion relation, as discussed in FIG. 9.

In embodiments, system 1100 may include an enclosure 1195 that contains at least one of computer 150, light element 110, base platform 124, interferometer 130, and display device 1190. Further, the enclosure 1195 may be an in-line metrology tool for providing wafer-level uniformity measurement of critical magnetic matter parameters during a manufacturing process of CMOS-compatible magnetic random-access memory (MRAM).

Validation

An experiment was conducted to validate the findings from implementing the disclosed method. For validation of the method of the present disclosure, and system may be constructed, where a set of thin film samples with known thicknesses, each of which may include magnetic thickness, t, and a dead layer, is used as samples. The sets of data shown in plots 750, 760, and 770 are an example of this validation step with thin film thicknesses of 14 nm, 3 nm and 1.4 nm, respectively. A set of data points 730 for each thin film thickness may be fitted to simultaneously determine the parameters of $A_{ex}$, $M_S$, and t for both DE and BV modes of spin waves at room temperature. Fitted results are shown in TABLE 1 below.

Because of the highly correlated nature of simultaneously fitted parameters, further validation may be performed. Utilizing an established technique, such as SQUID, one of the three fitted parameters is measured, such as the magnetic thickness, t, and having the measured parameter as a fixed parameter, the remaining two parameters may be determined by a simultaneous fit. TABLE 2 shows the fitted parameters of $A_{ex}$ and $M_S$ with magnetic thickness, t, as a fixed parameter, measured using SQUID method. TABLES 1 and 2 show statistically equivalent measured values.

The validation may include simulations, such as Monte Carlo method, comparison of one or more of fitted parameters with results from other methods, such as neutron scattering, SQUID, or ferromagnetic resonance.

TABLE 1

| Thin film thickness (nm) | $\mu_0 M_S$(T) | $A_{ex}$(pJ/m) | t (nm) |
|---|---|---|---|
| 1.4 | 1.881 ± 0.002 | 20.9 ± 0.6 | 1.36 ± 0.03 |
| 3 | 1.769 ± 0.007 | 21.3 ± 1.3 | 3.30 ± 0.07 |
| 14 | 1.856 ± 0.013 | 22.4 ± 2.4 | 13.93 ± 0.25 |

TABLE 2

| Thin film thickness (nm) | $\mu_0 M_S$(T) | $A_{ex}$(pJ/m) |
|---|---|---|
| 1.4 | 1.881 ± 0.001 | 20.9 ± 0.5 |
| 3 | 1.792 ± 0.012 | 20.4 ± 2.6 |
| 14 | 1.854 ± 0.005 | 22.6 ± 1.5 |

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween. For example, the embodiments of the present disclosure are not limited to two sets of signatures and may include three, four, etc. sets of signatures.

Combination of Features

The following embodiments are specifically contemplated, as well as any combinations of such embodiments that are compatible with one another:

(A) A method for determining at least one property of magnetic matter, comprising applying a magnetic field to magnetic matter; directing first light on the magnetic matter at a first set of incident angles; receiving a first set of signatures associated with the first light scattered from the magnetic matter; varying orientation of the magnetic matter with respect to the magnetic field; directing second light on the magnetic matter at a second set of incident angles; receiving a second set of signatures associated with the second light scattered from the magnetic matter; determining, by processing the first set and the second set of signatures according to a dispersion relation, at least one property of the magnetic matter.

(B) In the embodiment denoted by (A), the at least one property of the magnetic matter includes at least one of an exchange parameter, a saturation magnetization, and a thickness of a magnetic layer of the magnetic matter.

(C) In either the embodiment denoted by (A) or (B), the magnetic matter is a thin magnetic film deposited on a non-ferromagnetic material.

(D) In any of the embodiments denoted by (A)-(C), the processing the first set and the second set of signatures according to the dispersion relation includes mapping the received first set and second set of signatures and fitting the first set and the second set of signatures according to a dispersion relation.

(E) In any of the embodiments denoted by (A)-(D), varying the orientation of the magnetic matter with respect to the applied magnetic field includes rotating the magnetic matter in a plane such that the first set of incident angles is approximate to the second set of incident angles.

(F) In any of the embodiments denoted by (A)-(E), varying the orientation of the magnetic matter with respect to the applied magnetic field includes rotating the first and second directed light by an angle, in a plane, such that the first set of incident angles is approximate to the second set of incident angles.

(G) In any of the embodiments denoted by (A)-(F), the first set of incident angles and the second set of incident angles are the same set of incident angles.

(H) In any of the embodiments denoted by (A)-(G), directing the first and second light comprises utilizing a single light element.

(I) In any of the embodiments denoted by (A)-(H), directing the first and second light comprises utilizing two different light elements.

(J) In any of the embodiments denoted by (A)-(I), applying the magnetic field to the magnetic matter comprises applying the magnetic field using a rare earth magnet.

(K) In any of the embodiments denoted by (A)-(J), applying the magnetic field to the magnetic matter comprises applying the magnetic field by an electromagnetic device.

(L) In any of the embodiments denoted by (A)-(K), the dispersion relation is defined by the equation:

$$f(k, H, \phi, t) =$$

$$\frac{\mu_0 \mu_B g}{h} \sqrt{\left(H - H_k + \frac{2A_{ex}}{\mu_0 M_s}k^2 + \mathcal{N} M_s\left(\frac{1-e^{-kt}}{kt}\right)\right)\left(H + \frac{2A_{ex}}{\mu_0 M_s}k^2 + \mathcal{N} M_s\left(\frac{1-e^{-kt}}{kt}\right)\sin^2\phi\right)},$$

where f is a spin wave frequency, g is a spectroscopic splitting factor, H is the applied magnetic field, $H_k$ is an out-of-plane anisotropy, $A_{ex}$ is an exchange parameter, $M_s$ is a saturation magnetization, k is a spin wave wavenumber, $\mathcal{N}$ is a demagnetization factor for ultrathin films, given by $$\mathcal{N} = 1 - \frac{0.2338}{n},$$

where n is a number of monolayers, t is a thickness of the magnetic layer of the magnetic matter, and ϕ is an angle between a wavevector of the magnetic matter, created from the directed light and the applied magnetic field, with $\sin^2 \phi = 0$ for when the angle is zero for a first applied magnetic field and $\sin^2 \phi = 1$ for when the angle is 90 degrees for a second applied magnetic field.

(M) A system for determining at least one property of magnetic matter, including: at least one processor; a memory communicatively coupled with the at least one processor and storing machine readable instructions that, when executed by the processor, cause the processor to: a system for determining at least one property of magnetic matter, including: at least one processor; a memory communicatively coupled with the at least one processor and storing machine readable instructions that, when executed by the processor, cause the processor to: initiate emission of a magnetic field onto magnetic matter; initiate illumination of first light onto the magnetic matter at a first set of incident angles; receive a first set of signatures associated with the first light scattered from the magnetic matter; direct change in orientation of the magnetic matter with respect to the magnetic field; initiate emission of second light on the magnetic matter at a second set of incident angles; receive a second set of signatures associated with the second light scattered from the magnetic matter; determine, by processing the first set and the second set of signatures according to a dispersion relation, at least one property of the magnetic matter.

(N) In the embodiment denoted by (M), the at least one property of the magnetic matter includes at least one of an exchange parameter, a saturation magnetization, and a thickness of a magnetic layer of the magnetic matter.

(O) In either the embodiment denoted by (M) or (N), the processing the first set and the second set of signatures according to the dispersion relation comprises further causing the processor to map the received first set and second set of signatures and fit the first set and the second set of signatures according to a dispersion relation.

(P) In any of the embodiments denoted by (M)-(O), the processor directing change of the magnetic matter with respect to the applied magnetic field further comprises causing the processor to initiate rotation of a base platform supporting the magnetic matter in a plane such that the first set of incident angles is approximate to the second set of incident angles.

(Q) In any of the embodiments denoted by (M)-(P), the first light and the second light are the same light, wherein the at least one processor directing change of the magnetic matter with respect to the applied magnetic field comprises further causing the at least one processor to initiate rotation of the illuminated first light, by an angle, in a plane such that the first set of incident angles is approximate to the second set of incident angles.

(R) In any of the embodiments denoted by (M)-(Q), the angle is ninety degrees.

(S) In any of the embodiments denoted by (M)-(R), the at least one processor to initiating the illumination of the first and second light comprises further causing the at least one processor to utilize two different light elements.

(T) In any of the embodiments denoted by (M)-(S), the at least one processor initiating emission of the magnetic field to the magnetic matter comprises further causing the processor to initiate emission of a magnetic field from a rare earth magnet.

(U) In any of the embodiments denoted by (M)-(T), wherein initiating emission of the magnetic field to the magnetic matter comprises further causing the at least one processor to initiate emission of an electromagnetic device.

(V) In any of the embodiments denoted by (M)-(U), the dispersion relation is defined by the equation:

$$f(k, H, \phi, t) =$$

$$\frac{\mu_0 \mu_B g}{h} \sqrt{\left(H - H_k + \frac{2A_{ex}}{\mu_0 M_s}k^2 + \mathcal{N} M_s\left(\frac{1-e^{-kt}}{kt}\right)\right)\left(H + \frac{2A_{ex}}{\mu_0 M_s}k^2 + \mathcal{N} M_s\left(\frac{1-e^{-kt}}{kt}\right)\sin^2\phi\right)},$$

where f is a spin wave frequency, g is a spectroscopic splitting factor, H is the applied magnetic field, $H_k$ is an out-of-plane anisotropy, $A_{ex}$ is an exchange parameter, $M_s$ is a saturation magnetization, k is a spin wave wavenumber, $\mathcal{N}$ is a demagnetization factor for ultrathin films, given by $$\mathcal{N} = 1 - \frac{0.2338}{n},$$

where n is a number of monolayers of the magnetic matter, t is a thickness of the magnetic layer of the magnetic matter, and ϕ is an angle between a wavevector of the magnetic matter, created from the directed light and the applied magnetic field, with $\sin^2\phi=0$ for when an angle is zero for the first applied magnetic field and $\sin^2\phi=1$ for when the angle is 90 degrees for the second applied magnetic field.

(W) A system for determining at least one magnetic property of a magnetic matter, comprising: a magnetic element for applying a magnetic field to magnetic matter in parallel direction to a top surface of the magnetic matter in at least one orientation; a light element for directing incident light onto the magnetic matter at at least at one incident angle with respect to the normal of the top surface for each orientation of the applied magnetic field; an interferometer for calculating a frequency difference between the incident light and light scattered from the magnetic matter for each incident angle; and a processor configured to determine at least one magnetic property of the magnetic matter by processing a dataset that includes each frequency difference and a dispersion relation.

(X) In the embodiment denoted by (W), the magnetic element comprising a permanent magnet or an electromagnet.

(Y) In either the embodiment denoted by (W) or (X), the light element comprising a single frequency laser.

(Z) In any of the embodiments denoted by (W)-(Y), the orientations of the magnetic element including: a first orientation of the magnetic field being perpendicular to the in-plane direction of the incident light; and a second orientation of the magnetic field being parallel to in-plane direction of the incident light.

(AA) In any of the embodiments denoted by (W)-(Z), the dispersion relation being described by the equation:

$$f(k, H, \phi, t) = \frac{\mu_0 \mu_B g}{h} \sqrt{\left(H - H_k + \frac{2A_{ex}}{\mu_0 M_s}k^2 + \mathcal{N} M_s\left(\frac{1-e^{-kt}}{kt}\right)\right)\left(H + \frac{2A_{ex}}{\mu_0 M_s}k^2 + \mathcal{N} M_s\left(\frac{1-e^{-kt}}{kt}\right)\sin^2\phi\right)},$$

where f is a spin wave frequency, g is a spectroscopic splitting factor, H is the applied magnetic field, $H_k$ is an out-of-plane anisotropy, $A_{ex}$ is an exchange parameter, $M_s$ is a saturation magnetization, k is a spin wave wavenumber, $\mathcal{N}$ is a demagnetization factor for ultrathin films, given by $$\mathcal{N} = 1 - \frac{0.2338}{n},$$

where n is a number of monolayers of the magnetic matter, t is a thickness of a magnetic layer of the magnetic matter, and ϕ is the angle between the direction of spin waves of the magnetic matter, created from the incident light and the applied magnetic field.

(AB) In any of the embodiments denoted by (W)-(AA), the processor determining the magnetic properties includes determining an exchange parameter $A_{ex}$, saturation magnetization $M_s$, and magnetic thickness t, of the magnetic matter, simultaneously by fitting the spin wave dispersion relation to the dataset.

(AC) In any of the embodiments denoted by (W)-(AB), further comprising a motorized base platform configured to orient the magnetic matter.

(AD) In any of the embodiments denoted by (W)-(AC), further comprising a motorized base platform configured to orient the magnetic element.

(AE) In any of the embodiments denoted by (W)-(AD), the processor further configured to implement instructions to position the light element along a plane orthogonal to the top surface of the magnetic matter, such that all positions of the light element create spin waves in one direction on the magnetic matter, and each position of the light element has a unique incident angle.

(AF) In any of the embodiments denoted by (W)-(AE), further comprising a set of light elements, the light elements aligned in a plane orthogonal to the top surface of the magnetic matter, such that all of the light elements create spin waves in one direction on the magnetic matter, and each of the set of light elements has a unique incident angle.

(AG) In any of the embodiments denoted by (W)-(AF), the processor communicatively couples to at least one of the light element, a motorized base platform, and the interferometer.

(AH) In any of the embodiments denoted by (W)-(AG), the magnetic matter is a thin magnetic film deposited on a wafer.

(AI) In any of the embodiments denoted by (W)-(AH), further comprising an enclosure for housing at least one of a motorized base platform, the light element, the interferometer and the processor.

(AJ) In any of the embodiments denoted by (W)-(AI), the enclosure is an in-line metrology tool for providing wafer-level uniformity measurement of matter parameters during a manufacturing process of CMOS-compatible magnetic random-access memory.

What is claimed is:

1. A method, comprising:
   applying a magnetic field onto magnetic matter;
   directing first light onto the magnetic matter at a first set of incident angles;
   receiving a first set of signatures associated with the first light scattered from the magnetic matter;
   varying an orientation of the magnetic matter with respect to the magnetic field;
   directing second light onto the magnetic matter at a second set of incident angles;
   receiving a second set of signatures associated with the second light scattered from the magnetic matter;
   mapping the first set of signatures and the second set of signatures to a first set of spin waves and a second set of spin waves, respectively; and
   determining at least one property of the magnetic matter by fitting the first set of spin waves and the second set of spin waves to a dispersion relation.

2. The method of claim 1, wherein the at least one property of the magnetic matter includes at least one of an exchange parameter, a saturation magnetization, and a thickness of a magnetic layer of the magnetic matter.

3. The method of claim 2, wherein the magnetic matter is a thin magnetic film deposited on a non-ferromagnetic material.

4. The method of claim 1, wherein said varying the orientation of the magnetic matter with respect to the magnetic field includes rotating the magnetic matter in a plane such that the first set of incident angles is equal to the second set of incident angles.

5. The method of claim 1, wherein said varying the orientation of the magnetic matter with respect to the magnetic field includes rotating one or both of the first light and the second light by an angle in a plane such that the first set of incident angles is equal to the second set of incident angles.

6. The method of claim 1, wherein the dispersion relation is defined by the equation:

$$f(k, H, \phi, t) = \frac{\mu_0 \mu_B g}{h} \sqrt{\left(H - H_k + \frac{2A_{ex}}{\mu_0 M_s}k^2 + \mathcal{N} M_s\left(\frac{1-e^{-kt}}{kt}\right)\right)\left(H + \frac{2A_{ex}}{\mu_0 M_s}k^2 + \mathcal{N} M_s\left(\frac{1-e^{-kt}}{kt}\right)\sin^2\phi\right)}$$

where f is a frequency of a spin wave, g is a spectroscopic splitting factor, H is a magnetic-field strength of the magnetic field, $H_k$ is an out-of-plane anisotropy, $A_{ex}$ is an exchange parameter, $M_s$ is a saturation magnetization, k is a wavenumber of the spin wave, $\mathcal{N}$ is a demagnetization factor for ultrathin films, t is a thickness of a magnetic layer of the magnetic matter, and $\phi$ is an angle between a direction of the spin wave and a direction of the magnetic field.

7. The method of claim 6, wherein the demagnetization factor is given by $\mathcal{N} = 1-0.2338/n$, where n is a number of monolayers.

8. The method of claim 6, wherein:
said applying comprises applying the magnetic field onto the magnetic matter such that the angle $\phi$ is zero; and
said varying comprises varying the orientation of the magnetic matter with respect to the magnetic field such that the angle $\phi$ is 90 degrees.

9. A system, comprising:
at least one processor; and
a memory communicatively coupled with the at least one processor and storing machine-readable instructions that, when executed by the at least one processor, control the system to:
apply a magnetic field onto magnetic matter;
direct first light onto the magnetic matter at a first set of incident angles;
receive a first set of signatures associated with the first light scattered from the magnetic matter;
vary an orientation of the magnetic matter with respect to the magnetic field;
direct second light onto the magnetic matter at a second set of incident angles;
receive a second set of signatures associated with the second light scattered from the magnetic matter;
map the first set of signatures and the second set of signatures to a first set of spin waves and a second set of spin waves, respectively; and
determine at least one property of the magnetic matter by fitting the first set of spin waves and the second set of spin waves to a dispersion relation.

10. The system of claim 9, wherein the at least one property of the magnetic matter includes at least one of an exchange parameter, a saturation magnetization, and a thickness of a magnetic layer of the magnetic matter.

11. The system of claim 9, wherein the machine-readable instructions that, when executed by the at least one processor, control the system to vary the orientation include machine-readable instructions that, when executed by the at least one processor, control the system to rotate a base platform supporting the magnetic matter in a plane such that the first set of incident angles is equal to the second set of incident angles.

12. The system of claim 9, wherein:
the first light and the second light are the same light; and
the machine-readable instructions that, when executed by the at least one processor, control the system to vary the orientation include machine-readable instructions that, when executed by the at least one processor, control the system to rotate one or both of the first light and the second light by an angle in a plane such that the first set of incident angles is equal to the second set of incident angles.

13. The system of claim 9, wherein the dispersion relation is defined by the equation:

$$f(k, H, \phi, t) = \frac{\mu_0 \mu_B g}{h} \sqrt{\left(H - H_k + \frac{2A_{ex}}{\mu_0 M_s}k^2 + \mathcal{N} M_s\left(\frac{1-e^{-kt}}{kt}\right)\right)\left(H + \frac{2A_{ex}}{\mu_0 M_s}k^2 + \mathcal{N} M_s\left(\frac{1-e^{-kt}}{kt}\right)\sin^2\phi\right)},$$

where f is a frequency of a spin wave, g is a spectroscopic splitting factor, H is a magnetic-field strength of the magnetic field, $H_k$ is an out-of-plane anisotropy, $A_{ex}$ is an exchange parameter, $M_s$ is a saturation magnetization, k is a wavenumber of the spin wave, $\mathcal{N}$ is a demagnetization factor for ultrathin films, t is a thickness of a magnetic layer of the magnetic matter, and $\phi$ is an angle between a direction of the spin wave and a direction of the magnetic field.

14. The system of claim 13, wherein the demagnetization factor is given by $\mathcal{N} = 1-0.2338/n$, where n is a number of monolayers.

15. The system of claim 13, wherein:
the machine-readable instructions that, when executed by the at least one processor, control the system to apply the magnetic field include machine-readable instructions that, when executed by the at least one processor, control the system to apply the magnetic field onto the magnetic matter such that the angle $\phi$ is zero; and
the machine-readable instructions that, when executed by the at least one processor, control the system to apply the magnetic field include machine-readable instructions that, when executed by the at least one processor, control the system to apply the magnetic field onto the magnetic matter such that the angle $\phi$ is 90 degrees.

* * * * *